United States Patent
Gerdes et al.

[19]

[11] Patent Number: 5,922,170
[45] Date of Patent: Jul. 13, 1999

[54] HOLLOW VIBRATIONAL HORN

[75] Inventors: Ronald W. Gerdes, St. Paul; Haregoppa S. Gopalakrishna, Woodbury, both of Minn.

[73] Assignee: Minnesota Mining and Manufacturing Company, St. Paul, Minn.

[21] Appl. No.: 08/942,469

[22] Filed: Oct. 2, 1997

[51] Int. Cl.⁶ ........................................... B32B 31/00
[52] U.S. Cl. ........................... 156/580.2; 156/580.1
[58] Field of Search .................. 156/73.1, 580.1, 156/580.2; 425/174.2; 264/442, 443, 445; 228/1.1, 110.1

[56] References Cited

U.S. PATENT DOCUMENTS

| | | | |
|---|---|---|---|
| 3,947,307 | 3/1976 | Buchscheidt | 156/73.1 |
| 4,063,990 | 12/1977 | Volz et al. | 156/580.2 |
| 4,131,505 | 12/1978 | Davis, Jr. | 156/580.1 |
| 5,244,520 | 9/1993 | Gordon et al. | 156/73.1 |
| 5,275,767 | 1/1994 | Micciche | 156/580.2 X |
| 5,421,923 | 6/1995 | Clarke et al. | 156/73.1 |
| 5,476,570 | 12/1995 | Widmann | 156/515 |

FOREIGN PATENT DOCUMENTS 1227702  10/1966  Germany .
671529   9/1989  Switzerland .

OTHER PUBLICATIONS

Eastman Website, www.eastman.com/ppbo/design/horn.shtml Sep. 1995.
Industry Net Website, Dec. 1997 www.industry.net/c–a/showfi . . . 2676&comp_id=03TSD&base_region–%2a.
Itoh K et al: "Basic study on large scale cylindrical horn of ultrasonic plastic welder" Journal of the Acoustical Society of Japan, Oct. 1984, Japan. vol. 40, No. 10, ISSN 0369–4232, pp. 714–720, XP002070707.
Patent Abstracts of Japan vol. 012, No. 152 (M–695), May 11, 1988 & JP 62 273832 A (Eiji Mori; Others: 01), Nov. 27, 1987.

Primary Examiner—James Sells
Attorney, Agent, or Firm—Charles D. Levine

[57] ABSTRACT

The horn includes an outer cylinder and an inner shaft connected by a disk. The shaft has an axial input end, and receives vibrational energy at the axial input end and transmits the vibrational energy to the cylinder. The cylinder is hollow and has an inner surface, an outer surface, and first and second opposing end surfaces. The second end surface serves as a welding surface which applies vibrational energy to an object. The welding surface moves with the application of vibrational energy to the input end of the shaft. The disk portion connects the inner shaft to the cylinder and transmits the vibrational energy from the inner shaft to the cylinder.

10 Claims, 5 Drawing Sheets

HOLLOW VIBRATIONAL HORN

TECHNICAL FIELD

The present invention relates to vibrational horns. More particularly, the present invention relates to ultrasonic welding horns.

BACKGROUND OF THE INVENTION

Ultrasonic welding a critical process for manufacturing face masks. For most masks, a cup-shaped filter media is bonded by ultrasonic welding to a substrate, or shell. The welding is performed around the outer periphery with a desired pattern. Depending on the product requirements and process conditions, several patterns are used, including the waffle pattern, peripheral weld pattern, and eyebrow pattern, shown in FIGS. 1A, 1B, and 1C. In some cases the patterns are used for both cutting and sealing operations. A common feature in all patterns is that the internal diameter is greater than 7–10 cm (3–4 in).

Current horns used for ultrasonically welding face masks generally have an outside diameter of 15 cm (6 in). The horn is formed with multiple slots machined radially through the center, as shown in FIG. 2. The slots are intended to control the amplitude profile of the horn at the weld surface. Without the slots, the amplitude varies greatly on the weld surface. In some cases, the welding amplitude at certain locations is zero and no welding occurs at these locations.

This slotted horn is used to perform peripheral welding of face masks and tacking of the layers. Normally a pattern is machined on the end of the horn opposite the input or excitation end. This design is fairly complicated to machine, and has proven to be unreliable in production. This has resulted in significant cost to fabricate spare horns, and in excess machine downtime. Also, the vibration amplitude on the weld surface varies 25–30% along the weld pattern. In order to achieve acceptable welds with this non-uniformity, the dwell time of the welding process must be increased, which results in reduced throughput of the entire machine. Nonuniformity can result in overwelding at some locations, or underwelding at others. This reduces the process window. For some products which contain thicker layers or increased numbers of layers, higher welding amplitudes are required. In such cases, this horn is limited, because higher amplitudes cause rapid failure. Moreover, the slots increase stresses in the horn and the horn is likely to fail at these slot locations.

Other designs are available, such as the "bell-shaped" horn, with or without slots, as shown in FIG. 3. None of these designs has been found to be totally acceptable due to displacement nonuniformity, amplitude restrictions, or premature failure.

SUMMARY OF THE INVENTION

A vibrational horn for imparting energy at a selected wavelength, frequency, and amplitude includes a shaft, a cylinder and a disk portion connecting the shaft and cylinder. The shaft receives vibrational energy at an axial input end and transmits the vibrational energy to the disk portion. The disk portion transmits the vibrational energy to the cylinder. The cylinder has an inner surface, an outer surface, and first and second opposing end surfaces. The shaft is located adjacent the first end surface and the second end surface serves as a welding surface which applies vibrational energy to an object. The cylinder is hollow and has an outer diameter that is greater than the diameter of the shaft. The welding surface moves as the cylinder expands and contracts with the application of vibrational energy to the input end of the shaft.

The cylinder can be a right circular cylinder or can have an elliptical diameter or can be rectangular or one of many other shapes. The length of the cylinder can be a multiple of approximately one-half wavelength of the horn material. In one embodiment the shaft is coaxial with the cylinder.

The horn can be an ultrasonic horn with the weld surface moving substantially in phase with the movement of the axial input end of the horn.

In one modification, the disk portion has a hollow on the side facing away from the welding surface to improve flexing of the cylinder. In another modification, the shaft has a notch formed on the axial output end to minimize stress for a given amplitude of operation. In another modification, the cylinder has an undercut on the inner surface to control the displacement along the welding surface. In another modification, the cylinder has an undercut on the outer surface to obtain the desired amplitude profile along the welding surface.

DETAILED DESCRIPTION

The ultrasonic welding horn of this invention can be used to bond multiple layers of material from face masks. Although the horn is designed for plunge welding of a face mask, it can be used to weld other materials such as molded plastic parts, plastic films, and nonwoven materials and to make many other products. Also, this horn can be used with other welding processes, such as scan welding, which can be easily accommodated due to the uniformity of the welding surface displacement and the simplicity of the design. The horn's size can be scaled up or down with minimal design effort, and any fairly shallow welding pattern can be machined on the welding surface.

This horn attains more uniform and higher amplitudes, with lower stresses, and can have a larger diameter than known horns. Higher and more uniform amplitudes require less weld time, resulting in a higher machine speed, a wider process window, and the ability to weld thicker and increased numbers of layers. Reduced stress increases the horn reliability and reduces machine down time. The bigger diameter horn accommodates larger weld patterns and provides more options for product enhancements and development.

Figure 4:
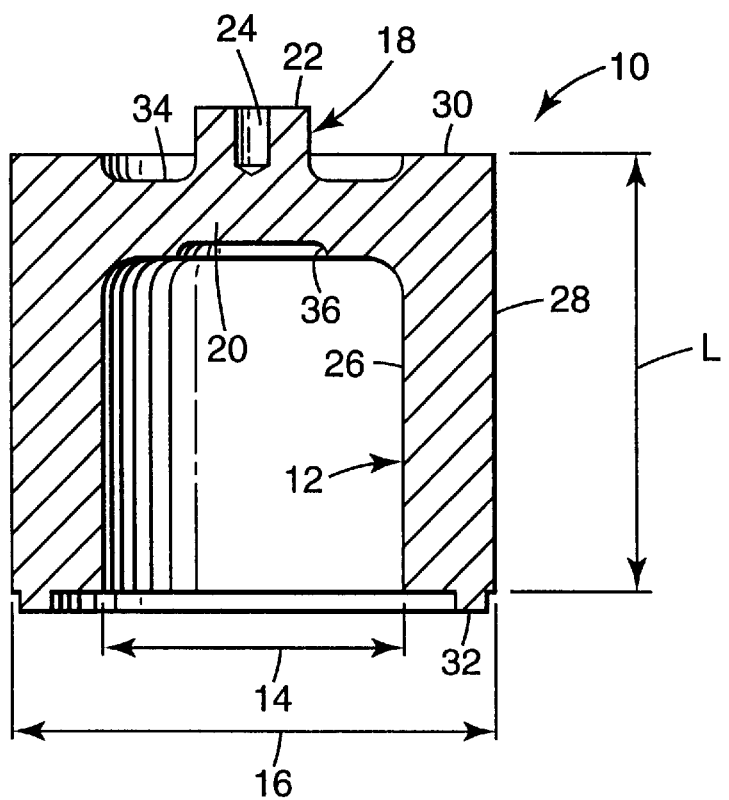
FIG. 4 is a cross-sectional view of the ultrasonic horn of the present invention.

FIG. 4 shows one embodiment of the ultrasonic horn of the invention. The horn imparts energy at a selected wavelength, frequency, and amplitude. The horn 10 is a hollow cylinder 12 with an inner diameter 14, in the illustrated embodiment, of 10 cm (4 in) and an outer diameter 16 of 16.26 cm (6.4 in). This design achieves acceptable uniform amplitude at all points between the inner and outer diameters 14, 16 on the welding face. Therefore, any shallow machined pattern on this welding face should exhibit uniform amplitude. For patterns whose depth is small compared to the length of the horn, extra material can be provided to machine the pattern. The total length of the horn is a multiple of approximately one half wavelength of the horn material. The horn can be made out of aluminum, titanium, steel or other materials. The horn dimensions depend on the wavelength of the material used to attain the half wavelength length requirement.

Although the horn 10 is shown as a single part, conceptually it includes an outer cylinder 12 (having inner and outer diameters 14, 16) and an inner shaft 18 connected by a disk 20. The shaft 18 can have any shape. A cylindrical shaft is most common. The shaft 18 has an axial input end 22 and an axial output end, and receives vibrational energy at the axial input end and transmits the vibrational energy at the axial output end. The axial output end is not a defined surface of the shaft 18. It is generally considered to be at the area where the shaft 18 connects to the disk 20.

The cylinder 12 can be a right circular cylinder, it can have an elliptical diameter, or it can have other shapes, such as polygonal (such as triangular, rectangular, pentagonal, etc.), and combinations of two or more shapes. It could be concave or convex. The cylinder 12 is hollow and has an inner surface 26 having the inner diameter 14, an outer surface 28 having the outer diameter 16, and first and second opposing end surfaces 30, 32. The shaft 18 is located adjacent the first end surface 30 (connected by the disk 20) and the second end surface 32 serves as a welding surface which applies vibrational energy to an object. The welding surface 32 moves as the cylinder 12 expands and contracts with the application of vibrational energy to the input end 22 of the shaft 18. The shaft 18 can be coaxial or eccentric with the cylinder 12. A tapped hole 24 on the cylinder 12 provides attachment to the booster (not shown) using a threaded stud (not shown). In an alternative embodiment, both end surfaces 30, 32 can serve as welding surfaces.

The disk portion 20 connects the inner shaft 18 to the cylinder 12 and transmits the vibrational energy from the inner shaft to the cylinder. As shown, the disk 20 can be circular although it can be other shapes depending on the shape of the horn. In alternative embodiments, the disk portion 20 need not be located adjacent the first end surface 30 of the cylinder 12. The disk portion could be located at any axial location with respect to the cylinder 12. Adjusting the location of the disk portion 20 can be used to change the gain of the horn (the ratio of the output to input amplitudes) and the amplitude profile on the weld surface 32. If the disk portion 20 is located centrally, the cylinder 12 can have both end surfaces 30, 32 serve as welding surfaces.

In one version, as shown in FIG. 4, the disk portion 20 optionally can have an annular hollow portion 34 on the side facing away from the welding surface 32 to improve flexing of the disk 20. Also, the shaft 18 optionally can have a notch 36 formed on the axial output end to minimize stress for a given mode of vibration. The notch 36 can extend for the entire circumference of the horn or only part.

Figure 2:
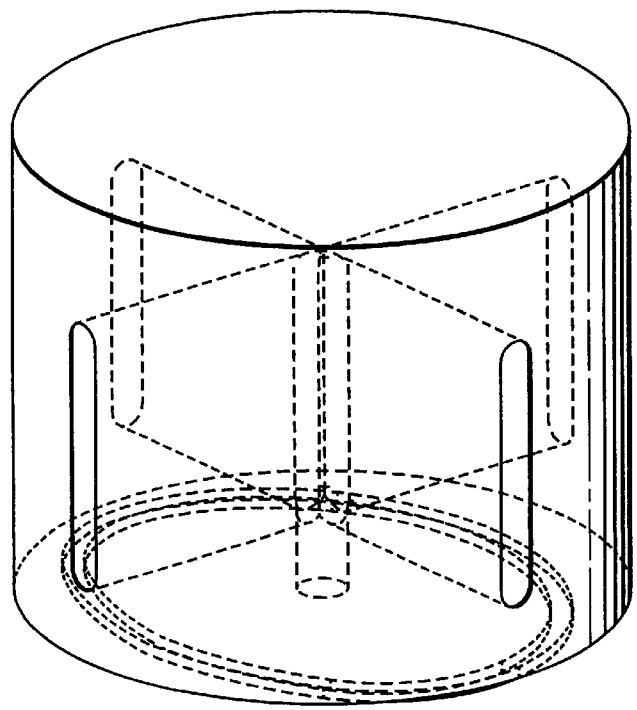
FIG. 2 is a perspective view of a known, slotted ultrasonic horn.
Figure 5A:
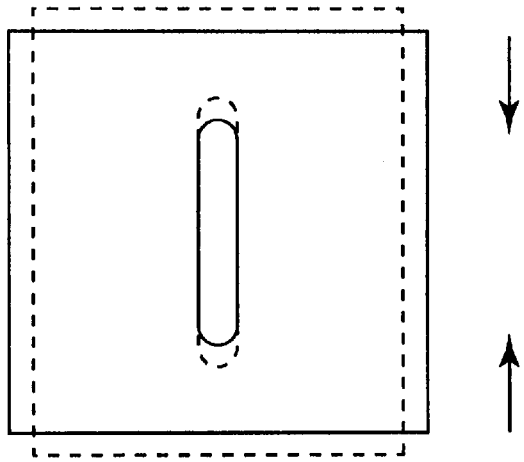
FIG. 5A is a cross-sectional view of the out of phase motion of a known bar horn.

In a conventional bar or cylinder horn having a length an odd integer multiple of approximately one half wavelength of the material, such as shown in FIG. 2, the input and output displacements are "out of phase" by 180 degrees. In other words, if the actuating surface (a booster mounting surface) moves inward, toward the center of the horn, the bottom welding surface also moves inward, as shown in FIG. 5A, and vice versa. In FIG. 5A, the broken line shows the undeformed shape of the horn and the solid line shows the deformed shape. If the downward motion of the actuating surface is considered negative, then the upward motion of the welding surface is positive. Therefore, the motion between the actuating surface and the weld surface is opposite in sign and is considered to be out of phase by 180 degrees.

Figure 5B:
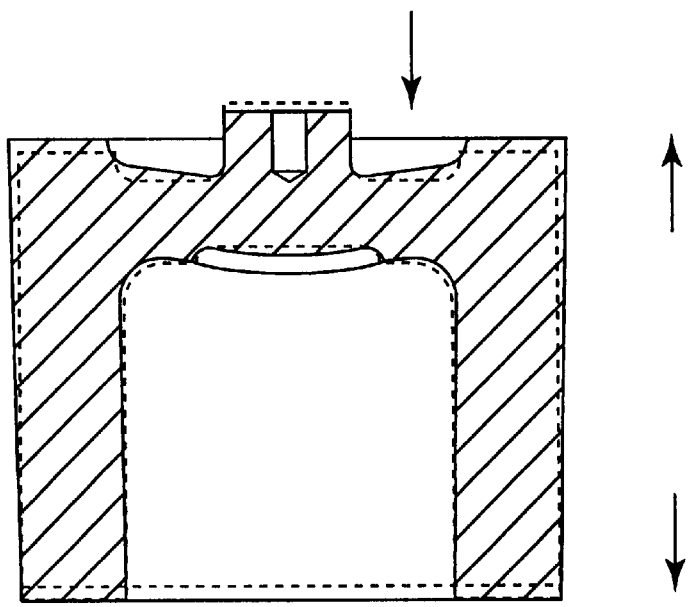
FIG. 5B is a cross-sectional view of the in phase motion of the horn of FIG. 4.

In the present invention, the vibration mode is opposite to the conventional horn. For example, consider a half wavelength horn, shown in FIG. 4, having a length L. As the actuating surface, the input end 22, moves downward, the welding surface 32 also moves downward, as shown in FIG. 5B. The displacement of the input end 22 and the welding surface 32 are in the same direction and hence the motion is identified as "in phase." The cylinder 12 acts as a bar horn because the opposing ends 30, 32 are out of phase. In every cycle of vibration, the outer cylinder 12 goes through compression and tension. The cylinder 12 is coupled with the shaft 18 by the disk 20. Thus, in every cycle of vibration, the disk 20 goes through bending motion and experiences radial compressive and tensile stresses.

In a conventional bar or cylinder horn having a length an even integer multiple of approximately one half wavelength of the material, the input and output are "in phase. In other words, if the actuating surface (a booster mounting surface) moves inward, toward the center of the horn, the bottom welding surface moves outward and vice versa. In the present invention for the horn of the same approximate length L, the input and output are "out of phase." As the actuating surface, the input end 22, moves downward, the welding surface 32 moves upward. The displacement of the input end 22 and the welding surface 32 are in opposite direction and the motion is "out of phase."

Figure 3:
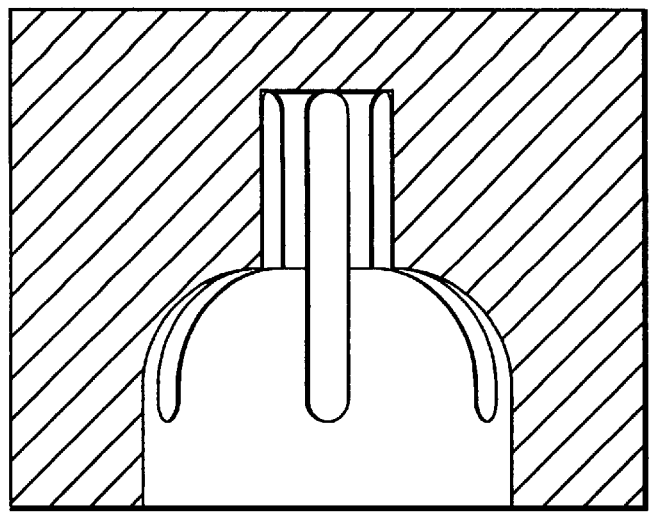
FIG. 3 is a cross-sectional view of a known, bell-shaped horn.

Another difference between the horn 10 of the invention and the horn of FIG. 2 or FIG. 3, is that the entire horn of FIG. 2 acts as a half-wavelength bar horn with the input and output surfaces acting axially at all points. In the horn 10 of the present invention, only the outer cylinder 12 acts as a half-wavelength bar horn with the input and output surfaces acting axially.

The amplitude profile on the welding surface 32, the gain in the horn 10, the resonant frequency, and the stress in the horn are functions of the inner diameter 14, the outer diameter 16, the thickness and axial position of the disk 20, the length of the horn 10, the depth of the hollow 34 and notch 36, and the material used for the horn 10. Several variations can be made from this basic configuration to alter gain, stress, amplitude uniformity, and the natural frequency. For example, the corners of the cylinder 12 at the first surface 30 can be chamfered. The disk portion 20 can extend beyond the outer diameter of the cylinder 12. And the cylinder 12 can extend beyond the disk portion 20 for all or a portion of the first surface 30.

Figure 6:
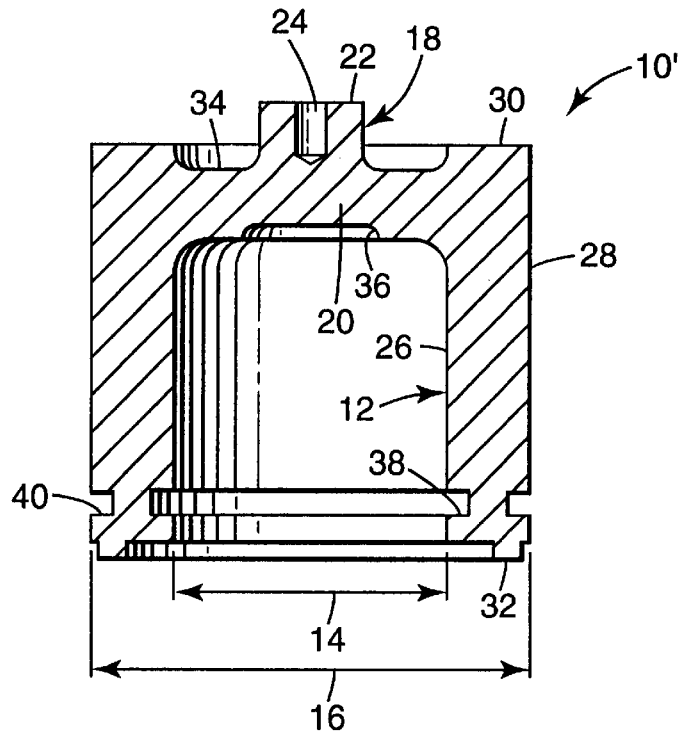
FIG. 6 is a cross-sectional view of another embodiment of the ultrasonic horn of the present invention.
Figure 7:
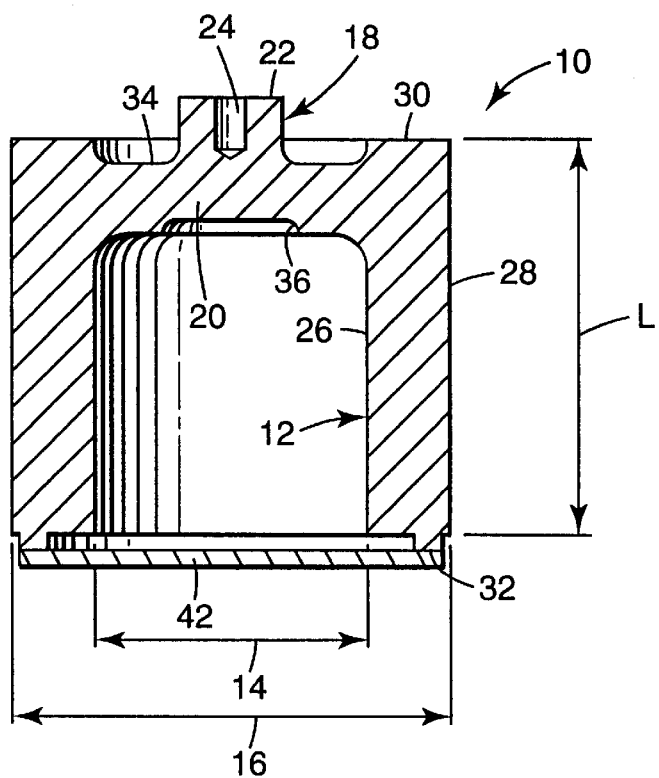
FIG. 7 is a cross-sectional view of another embodiment of the ultrasonic horn of the present invention.

Another design variation of the hollow vibrational horn is shown in FIG. 6 which has an outer diameter of 20 cm (8 in) and an inner diameter of 10 cm (4 in). In the horn 10' of FIG. 6, all of the features of the horn 10 are the same. To control the displacement along the welding surface 32, an undercut 38 is made on the inner surface 26 of the cylinder 12. A similar undercut 40 can be provided on the outer surface 28, if it is required to obtain the desired amplitude profile along the welding surface 32. The placement, depth, and width of the undercuts 38, 40 directly influence the amplitude profile on the welding surface 32. Also, the undercuts 38, 40 can extend completely around the cylinder 12 or partially around the cylinder. Optionally, a cap 42 can be placed across the second end surface 32 of the cylinder 12, as shown in FIG. 7. The cap 42 would serve as a larger welding surface while the horn still operates as a hollow horn as described above.

A primary advantage of the new hollow horn design, as compared with known horns, is that it has better displacement uniformity or controlled displacement profile. Both measurements and finite element analysis have shown that displacement variation of less than 5% is achieved. Better uniformity means that the dwell time for a plunge welding operation may be reduced, which leads to improved throughput for the welding operation, and often improved throughput for an entire production machine. Better uniformity also gives uniform weld and improved yield with a wider process window.

The hollow horn of this invention also has lower internal stresses. When internal stresses are reduced, the horn can withstand a greater number of cycles before failure. This leads to less machine downtime and reduced maintenance costs because each horn will last longer. Also, lower internal stresses allow the horn to attain a greater horn amplitude. A high amplitude horn can be used for processes that are not feasible with a lower amplitude horn, such as thick layer or multilayer webs for face masks.

The hollow horn is simple to machine. Simple machining will reduce fabrication costs. This horn should be cheaper to make than the existing horn. Also, the hollow horn has a larger diameter. It can accommodate larger weld patterns, more options for product modifications, and new developments.

EXAMPLE

The horn of FIG. 4 was made of 7075-T651 aluminum, and its welding frequency was measured to be 20.09 kHz. The gain was approximately 1.2. The output amplitude at the welding surface of the horn was measured when the horn was excited using different boosters as shown below.

| Booster Ratio | Outer Amplitude Mils p-p |
| --- | --- |
| 0.67:1 | 0.41 |
| 1.50:1 | 1.4 |
| 2.50:1 | 2.0 |
| 3.75:1* | 3.5 |

*This booster was actually a combination of 15:1 and a 2.5:1 booster in series

In all test cases the power drawn by the horn in air by the power supply was less than 50 watts, and the horn showed no signs of heating. The other vibrational modes of the horn occurred at 18.3 and 21.5 kHz, and are well separated from the operating frequency of 20.09 kHz. The uniformity of the amplitude along the weld surface was measured to be within 5%.

Figure 1A:
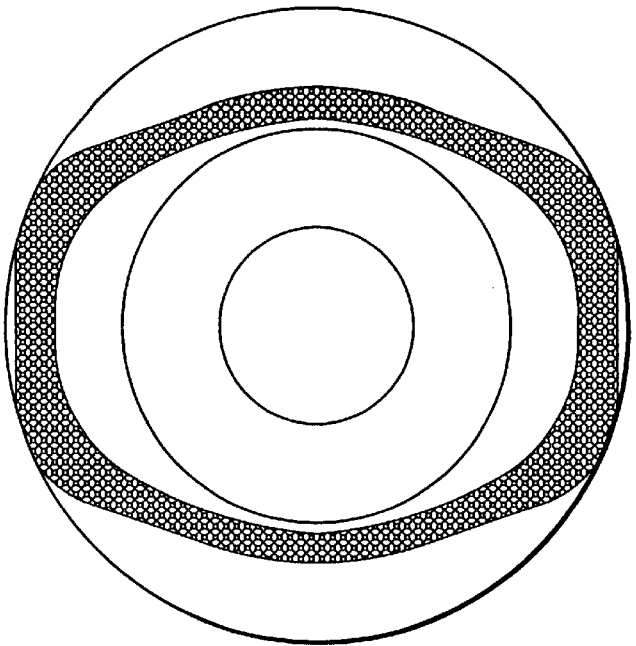
FIGS. 1A, 1B, and 1C show various weld patterns.
Figure 1B:
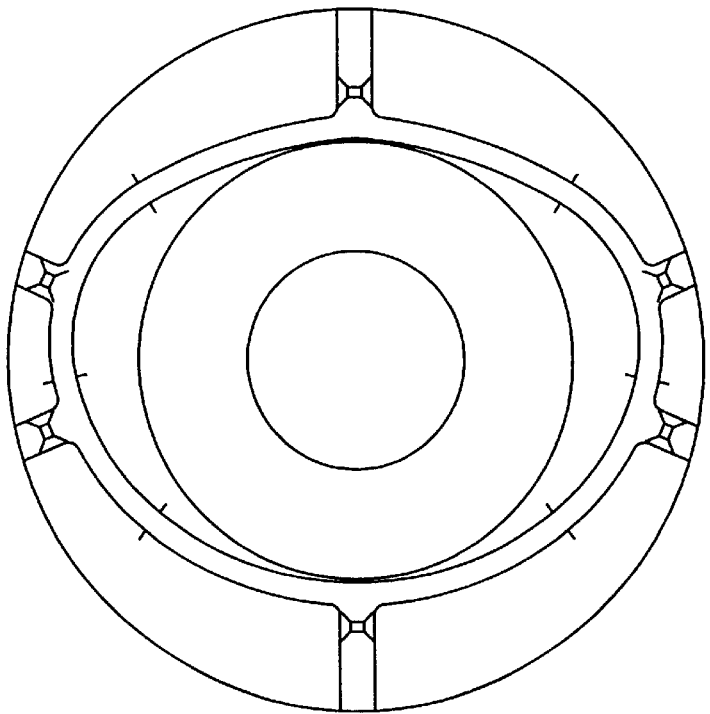

The waffle pattern shown in FIG. 1A was applied to another horn with the dimensions as shown in FIG. 4, except for the overall length. In order to accommodate this pattern, the cylinder length was increased by extending the welding surface downward by 0.25 cm (0.1 in), which is equal to the depth of the pattern. The frequency of this horn before machining the pattern was 19.85 kHz. After the waffle pattern was machined, the welding frequency was determined to be 20.01 kHz.

Figure 1C:
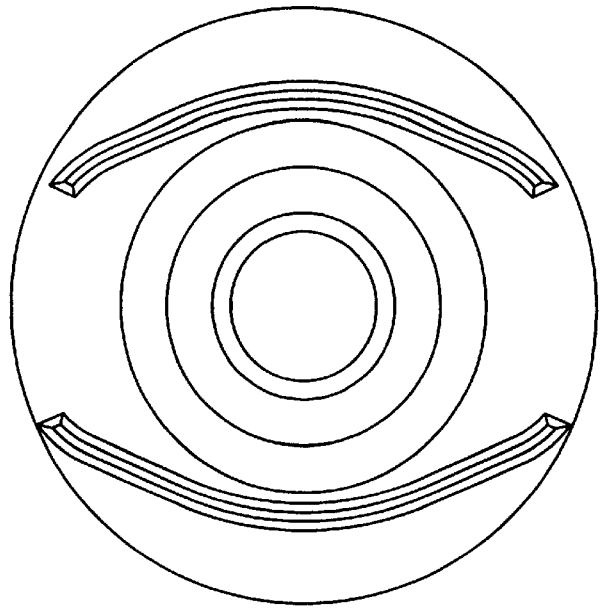

In comparison, a horn of FIG. 2 with the eyebrow pattern of FIG. 1C was made and installed on a production machine. This horn failed frequently and was unreliable. In some cases the horn failed immediately and in some cases after welding 500 parts. The hollow horn of this example has welded at least 25,000 parts without failing. Because of the amplitude uniformity there is increased yield in the welding process and has a widened the process window.

We claim:

1. A vibrational horn for imparting energy at a selected wavelength, frequency, and amplitude, wherein the horn comprises:

a shaft having an axial input end, wherein the shaft receives vibrational energy at the axial input end;

a cylinder having an inner surface, an outer surface, and first and second opposing end surfaces, wherein the shaft is located adjacent the first end surface and the second end surface serves as a welding surface which applies vibrational energy to an object, wherein the cylinder is hollow and has an outer diameter that is greater than the diameter of the shaft, and wherein the welding surface moves as the cylinder expands and contracts with the application of vibrational energy to the input end of the shaft; and a disk portion connecting the inner shaft to the cylinder, wherein the shaft transmits the vibrational energy to the disk portion and the disk portion flexibly transmits the vibrational energy to the cylinder, wherein regardless of whether the length of the cylinder is an odd or even integer multiple of approximately one-half wavelength of the horn material, the first end surface of the cylinder moves out of phase with the movement of the axial input end of the horn.

2. The horn of claim 1 wherein the length of the cylinder is an odd integer multiple of approximately one-half wavelength of the horn material, wherein the first end surface of the cylinder moves out of phase with the movement of the second end surface, and wherein the weld surface moves substantially in phase with the movement of the axial input end of the horn.

3. The horn of claim 1 wherein the length of the cylinder is an even integer multiple of approximately one-half wavelength of the horn material, wherein the first end surface of the cylinder moves in phase with the movement of the second end surface, and wherein the weld surface moves substantially out of phase with the movement of the axial input end of the horn.

4. The horn of claim 1 wherein the cylinder is one of circular, elliptical, polygonal, and a combination of these shapes.

5. The horn of claim 1 wherein the shaft is coaxial with the cylinder.

6. A vibrational horn for imparting energy at a selected wavelength, frequency and amplitude, wherein the horn comprises:

a shaft having an axial input end, wherein the shaft receives vibrational energy at the axial input end;

a cylinder having an inner surface, an outer surface, and first and second opposing end surfaces, wherein the shaft is located adjacent the first end surface and the second end surface serves as a welding surface which applies vibrational energy to an object, wherein the cylinder is hollow and has an outer diameter that is greater than the diameter of the shaft, and wherein the welding surface moves as the cylinder expands and contracts with the application of vibrational energy to the input end of the shaft; and a disk portion connecting the inner shaft to the cylinder, wherein the shaft transmits the vibrational energy to the disk portion and the disk portion transmits the vibrational energy to the cylinder, wherein the disk portion has a hollow on the side facing away from the welding surface to improve flexing of the disk.

7. A vibrational horn for imparting energy at a selected wavelength, frequency, and amplitude, wherein the horn comprises:

a shaft having an axial input end, wherein the shaft receives vibrational energy at the axial input end and wherein the shaft has a notch formed on the axial output end to minimize stress for a given mode of vibration;

a cylinder having an inner surface, an outer surface, and first and second opposing end surfaces, wherein the shaft is located adjacent the first end surface and the second end surface serves as a welding surface which applies vibrational energy to an object, wherein the cylinder is hollow and has an outer diameter that is greater than the diameter of the shaft, and wherein the welding surface moves as the cylinder expands and contracts with the application of vibrational energy to the input end of the shaft; and a disk portion connecting the inner shaft to the cylinder, wherein the shaft transmits the vibrational energy to the disk portion and the disk portion transmits the vibrational energy to the cylinder.

8. A vibrational horn for imparting energy at a selected wavelength, frequency, and amplitude, wherein the horn comprises:

a shaft having an axial input end, wherein the shaft receives vibrational energy at the axial input end;

a cylinder having an inner surface, an outer surface, and first and second opposing end surfaces, wherein the shaft is located adjacent the first end surface and the second end surface serves as a welding surface which applies vibrational energy to an object, wherein the cylinder is hollow and has an outer diameter that is greater than the diameter of the shaft, and wherein the welding surface moves as the cylinder expands and contracts with the application of vibrational energy to the input end of the shaft, wherein the cylinder has an undercut on the inner surface to control the displacement along the welding surface; and a disk portion connecting the inner shaft to the cylinder, wherein the shaft transmits the vibrational energy to the disk portion and the disk portion transmits the vibrational energy to the cylinder.

9. The horn of claim 1 wherein the cylinder has an undercut on the outer surface to obtain the desired amplitude profile along the welding surface.

10. A vibrational horn for imparting energy at a selected wavelength, frequency, and amplitude, wherein the horn comprises:

a shaft having an axial input end, wherein the shaft receives vibrational energy at the axial input end;

a cylinder having an inner surface, an outer surface, and first and second opposing end surfaces, wherein the shaft is located adjacent the first end surface and the second end surface serves as a welding surface which applies vibrational energy to an object, wherein the cylinder is hollow and has an outer diameter that is greater than the diameter of the shaft, and wherein the welding surface moves as the cylinder expands and contracts with the application of vibrational energy to the input end of the shaft;

a disk portion connecting the inner shaft to the cylinder, wherein the shaft transmits the vibrational energy to the disk portion and the disk portion transmits the vibrational energy to the cylinder; and a cap placed across the second end surface of the cylinder to serve as a larger welding surface while the horn still operates as a hollow horn.

* * * * *